United States Patent [19]
Huang et al.

[11] Patent Number: 6,016,166
[45] Date of Patent: Jan. 18, 2000

[54] METHOD AND APPARATUS FOR ADAPTIVE SYNCHRONIZATION OF DIGITAL VIDEO AND AUDIO PLAYBACK IN A MULTIMEDIA PLAYBACK SYSTEM

[75] Inventors: Yan Huang, Edison; Raymond K. Jones, Voorhees, both of N.J.

[73] Assignee: Lucent Technologies Inc., Murray Hill, N.J.

[21] Appl. No.: 09/144,161

[22] Filed: Aug. 31, 1998

[51] Int. Cl.[7] .................................................. H04N 9/475
[52] U.S. Cl. ........................................ 348/515; 345/328
[58] Field of Search .................................... 348/512, 525, 348/722, 423; 386/96, 110; 370/350, 503, 509, 516; 345/327, 328

[56] References Cited

U.S. PATENT DOCUMENTS

| | | | |
|---|---|---|---|
| 5,351,092 | 9/1994 | Poimboeuf et al. ...................... | 348/512 |
| 5,430,485 | 7/1995 | Laukford et al. ........................ | 348/423 |
| 5,594,660 | 1/1997 | Sung et al. ........................... | 364/514 R |
| 5,596,420 | 1/1997 | Daum ..................................... | 386/110 |
| 5,598,352 | 1/1997 | Rosenau et al. ......................... | 348/515 |
| 5,808,722 | 9/1998 | Suzuki ..................................... | 352/12 |
| 5,815,634 | 9/1998 | Daum et al. .............................. | 386/96 |
| 5,824,997 | 2/1999 | Haigh ..................................... | 348/423 |

*Primary Examiner*—Victor R. Kostak
*Attorney, Agent, or Firm*—Thomas J. Bean; Barry H. Freedman

[57] ABSTRACT

Synchronization among digital video and digital audio signals is maintained in a multimedia player with limited or highly varying processing power. In an exemplary embodiment of the invention, a processor with stored program memory controls the decoding and playback of audio blocks and video frames, each stream independently stored in an order of intended playback time. The processor gives priority to the decoding and playback of audio blocks, and periodically determines whether a backlog of encoded video frames exists. Under video backlog conditions, the processor reduces the backlog by decoding only those backlogged video frames that must be decoded in order to decode and play the frame in the sequence of backlogged video frames with the latest intended playback time. After decoding this latest backlogged frame, the processor directs it to be played. Normal video decoding and playback then resumes for video frames following this latest backlogged video frame in sequence and in intended playback time.

15 Claims, 7 Drawing Sheets

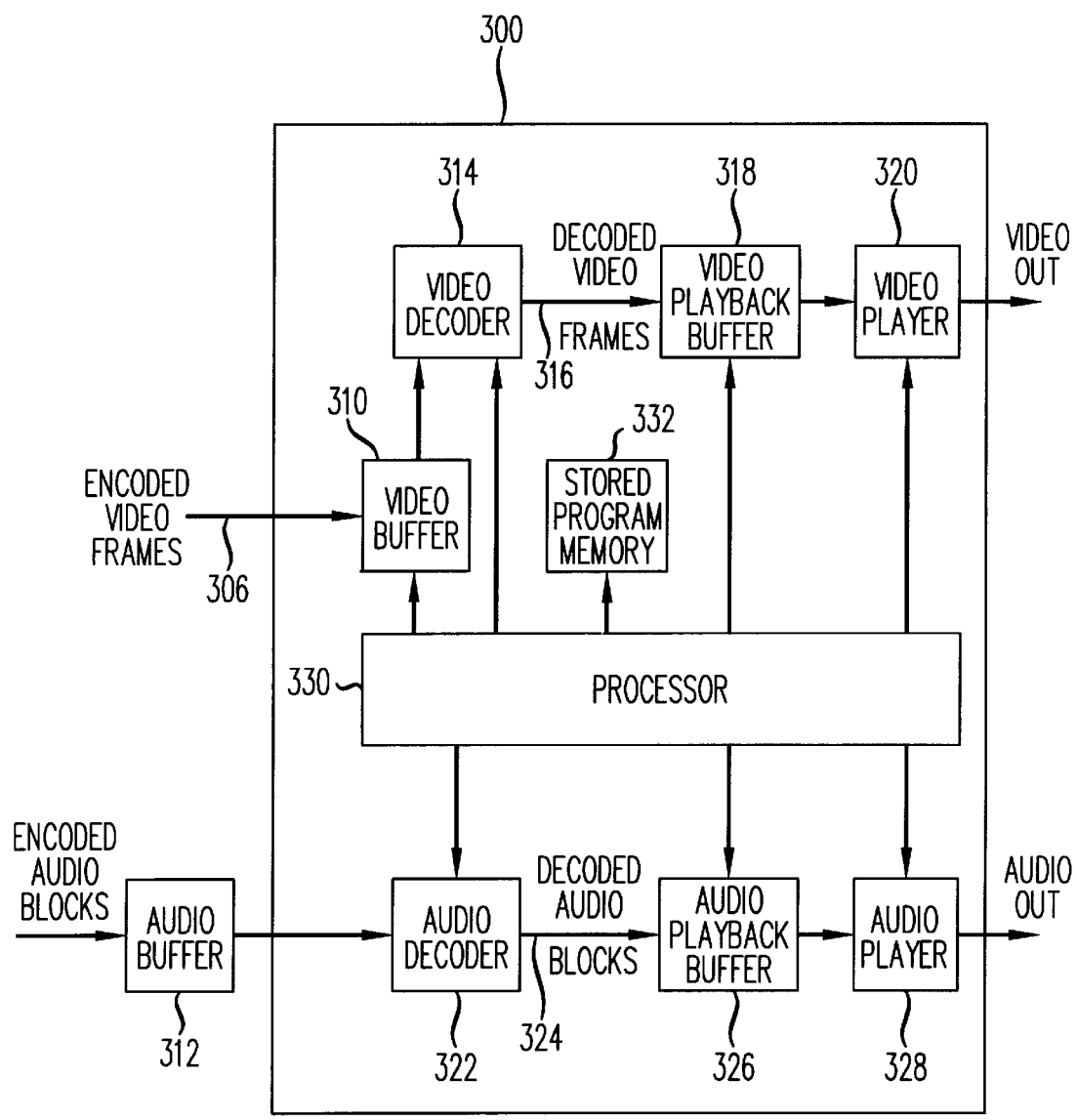

METHOD AND APPARATUS FOR ADAPTIVE SYNCHRONIZATION OF DIGITAL VIDEO AND AUDIO PLAYBACK IN A MULTIMEDIA PLAYBACK SYSTEM

FIELD OF THE INVENTION

This invention relates to multimedia systems. More particularly, this invention relates to the synchronized playback of digital video and digital audio information, such that user-perceived playback performance is improved while operating in a resource-limited or resource-varying playback environment.

BACKGROUND OF THE INVENTION

In a typical multimedia playback application, digital audio and digital video signals are created at a source and delivered in a mixed stream or in separate streams over a communications network such as the Internet to an intelligent playback device such as a personal computer equipped with an Internet browser and multimedia playback tools.

As is well known in the art, digital audio signals are typically created as an ordered sequence of digital samples of an analog audio signal. The analog signal is periodically sampled at a fixed interval, the inverse of which is known as the audio sampling rate. For storage or transmission purposes, the sequence of audio samples is often divided into non-overlapping segments known as audio blocks, with each audio block containing a prescribed number of audio samples.

Digital video signals are typically captured and represented as a sequence of still images in digital form. Each video image is generally known as a video frame. The number of video frames captured per unit of time is known as the video frame rate.

For efficiency in transferring video frames and audio blocks to a multimedia player, a multimedia source generally encodes this video and audio information. This information is often encapsulated in data packets (packetized) at the source before transmission over a data network to a player, with information added to the packets indicating the appropriate playback sequence and time for each transmitted audio block and video frame. At the player, encoded information is extracted from the packets, and then either directly decoded and played or stored for later processing. The playback of decoded data through a video or an audio playback device is commonly referred to as "rendering."

Most video encoding techniques, as reflected in standards such as MPEG-I, MPEG-II and H.263, use inter-frame coding to compress or reduce the amount of video information that must be transmitted to the player. Because only a subset of the pixels encoded in each digital video frame typically changes over successive frames, the amount of video information transmitted can be substantially reduced by encoding and transmitting only those pixels that change over successive frames. Such encoding techniques typically require the playback device to successfully decode one or more video frames adjacent to the current video frame in order to fully decode the current frame. In the event that adjacent video frames are ineffectively decoded or lost, most video encoding techniques also periodically insert "key" frames into the video stream, which contain sufficient information to be decoded independently of adjacent frames and can be used to restart the compressed video decoding process when necessary.

Because video frames require substantially more data than audio blocks, the multimedia data stream generally contains a smaller number of audio packets randomly interspersed among a larger number of video packets. These infrequently interspersed audio packets can lead to misalignment in the intended playback sequence of video frames and audio blocks upon arrival at the playback device. A number approaches have been applied to re-synchronize video and audio packets upon arrival (see, e.g., U.S. Pat. No. 5,598,352, issued to Rosenau et al., hereinafter referred to as the Rosenau '352 patent).

Even with re-synchronization of multimedia data stream elements upon arrival at the playback device, end-users may find multimedia playback performance to be inadequate. Although multimedia data may be fully streamed or otherwise stored in sequence on a playback device before playback begins, devices with low processing power or the overhead of other substantial and competing tasks may none-the-less suffer CPU backlogs that lead to momentary and longer-lasting interruptions to the multimedia playback experience. As users look to manufacturers for playback devices that are less expensive and able to serve many other simultaneous applications, playback device performance will continue to limit the potential performance of multimedia applications.

SUMMARY OF THE INVENTION

End user-perceived performance of a multimedia playback application is significantly enhanced by a novel invention for rendering synchronized digital video and digital audio information in a multimedia player with limited or highly varying processing power. Because users are typically less tolerant of interruptions in audio playback streams than in video playback streams, the multimedia player assigns highest priority to the decoding and rendering of audio blocks. Under circumstances where the players processing resources are limited, this prioritization scheme will likely cause video decoding and rendering to lag (or be "backlogged" relative to) audio decoding and rendering. Video rendering backlog is directly monitored, and if significant, reduced by performing a limited rendering of only the most current (or latest) video frame in the sequence of backlogged video frames. This is accomplished by decoding only those video frames in the backlogged sequence that are required to be decoded in order to render the most current backlogged video frame. Backlogged video frames not required to decode the most current backlogged frame are effectively discarded.

Advantageously, the need for sophisticated monitoring of playback device processing resources to determine backlogs is avoided, and user-perceived interruptions to the audio and video playback streams are minimized. Employing this invention, multimedia applications can be effectively rendered on a variety of playback devices with varying processing power. In addition, on a given playback device, multimedia applications are better able to recover from momentary loss of processing resources caused by other competing tasks.

BRIEF DESCRIPTION OF THE DRAWING

A more complete understanding of the invention may be obtained by reading the following description of specific illustrative embodiments of the invention in conjunction with the appended drawing in which:

FIG. 3(a) shows an illustrative embodiment of the invention;

Figure 1:
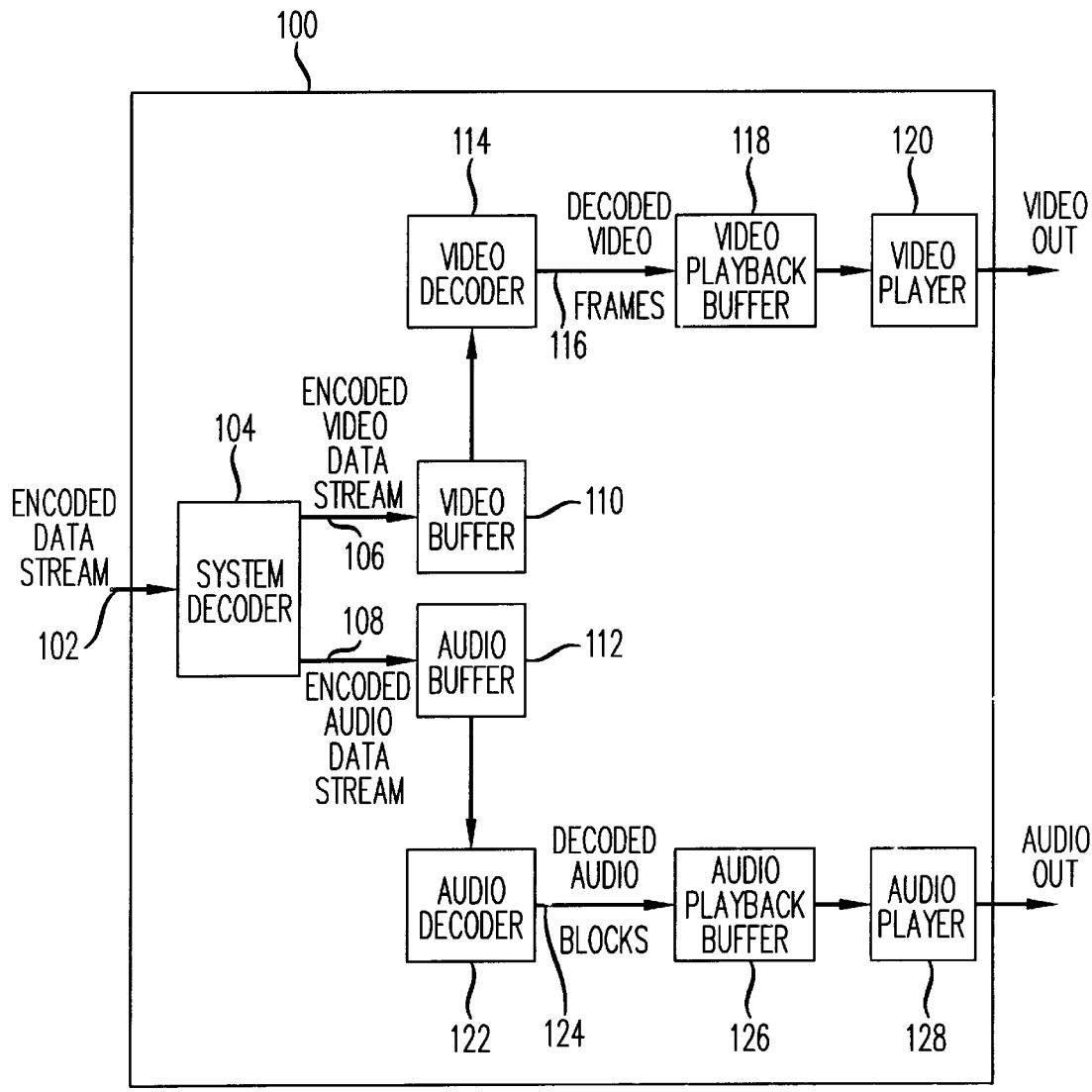
FIG. 1 provides a simplified block diagram of a prior art multimedia playback system.

For consistency and ease of understanding, those elements of each figure that are similar or equivalent share identification numbers that are identical in the two least significant digit positions (for example, video playback buffer 118 of FIG. 1 is equivalent to video playback buffer 318 of FIG. 3(a)).

DETAILED DESCRIPTION

As earlier noted, prior art multimedia playback systems typically receive a compressed, encoded digital signal that includes a mixed stream of video and audio data. These systems operate on this mixed data stream to separate and decode the video frames and audio blocks, and then to render these frames and blocks in an appropriate sequence and at an appropriate time. As a result, a video image and an audio output are produced in close synchrony to provide a coherent multimedia experience for the system user.

The basic components for such a system are illustrated in FIG. 1 (see, e.g., the Rosenau '352 patent). In this multimedia playback system 100, an encoded digital audio/video data stream 102 is input to a system decoder 104, which divides the stream into an encoded video data stream 106 and an encoded audio data stream 108.

A video buffer 110 receives the video data stream 106, and an audio buffer 112 receives the audio data stream 108. A video decoder 114 retrieves video data from the video buffer 110, decodes this data, assembles the data into video frames 116, and places each decoded video frame into a video playback buffer 118 to await playback (rendering) by a video player 120. Similarly, an audio decoder 122 retrieves audio data from the audio buffer 112, decodes this data, assembles the decoded data into audio blocks 124, and places each decoded audio block into an audio playback buffer 126 to await rendering by an audio player 128.

Various multimedia packetizing and encoding schemes exist in the prior art. FIG. 2(b) illustrates how the data may be encapsulated into packets according to the MPEG-I standard (see. e.g., the Rosenau '352 patent, incorporating the ISO/IEC 11172-1:1993(E) specification for MPEG-I). It can be appreciated that the present invention can be used to support a variety of different multimedia standards, including MPEG-II and H.263.

Figure 2:
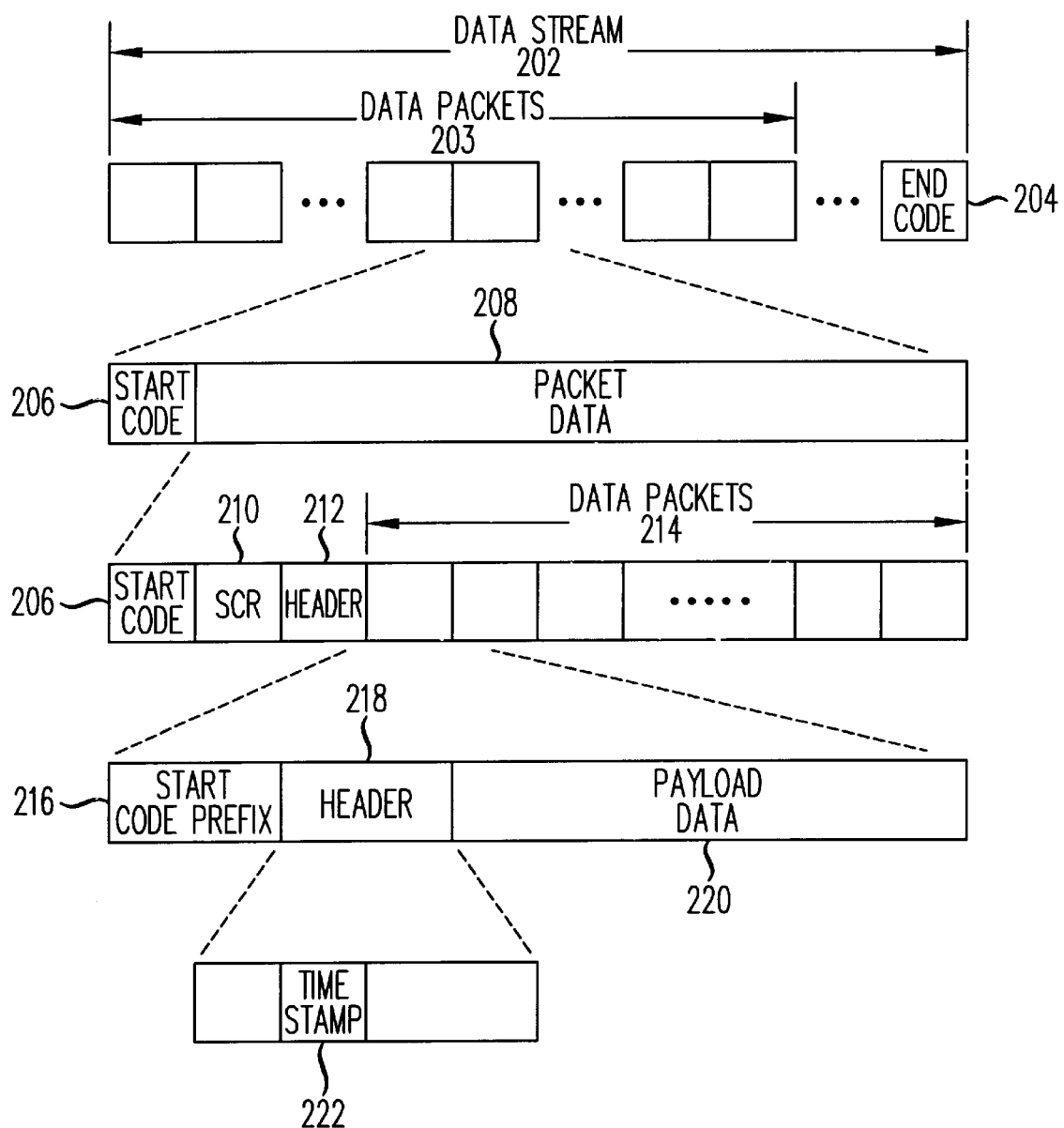
FIG. 2 shows a typical prior art encoded multimedia data stream format, consistent with the high-level organization and the MPEG-I standard.

In FIG. 2, a data stream 202 incorporates an ISO layer and a Pack layer. In the ISO layer, a series of data packages 203 are communicated until an end code 204 is delivered. Each package includes pack start code 206 and packet data 208. At the pack layer, each package 202 includes a pack start code 206, a system clock reference (SCR) 210, a system header 212 and packets of data 214. These packets 214 include both video packets and audio packets, with video packets, due to the nature of the data, being far more numerous. The system clock reference 210 provides an indication of system time, and a multiplexer rate referencing how often audio packets are interspersed between video packets.

As illustrated in FIG. 2(b), each video and audio packet 214 includes a start code prefix 216, header data 218 and payload data 220. Included in the header data 218 at various intervals is time stamp information 222, which may represent a video presentation time stamp (VPTS) if payload 220 contains video information, or an audio presentation time stamp (APTS) if payload 220 contains audio information. According to the MPEG-I standard, VPTS and APTS are provided to indicate appropriate playback times for associated video frames and audio blocks, respectively.

Standards such as MPEG-I, MPEG-II and H.263 provide for the digital encoding/decoding and compression/decompression of both video and audio signals. For efficiency, most video encoding techniques use inter-frame coding to compress or reduce the amount of video information that must be transmitted over the network to the playback device. For example, a mix of three frame types are used in the MPEG-I standard (see. e.g., the Rosenau '352 patent). A "key" frame (also referred to as an intra-frame or I-type frame) is encoded using only information about the frame itself. A predictive or P-type frame includes data encoded using a prediction model from a past reference frame. A bi-directional or B-type frame includes data encoded using a prediction model from a past and/or future reference frame. Through use of prediction models, data can be substantially compressed in both P-type and B-type frames to improve the overall speed of video data transmission.

Synchronization of audio blocks and video frames during playback is critical to a user's perception of playback performance. Significant misalignment between the audio and video playback sequences can cause playback to be unintelligible. The amount of data required to support a video playback sequence over a given time interval is inherently greater than the amount of data required for audio playback. As a result, the encoded video packets in the transmitted multimedia data stream are much more numerous than audio packets. The infrequent interspersion of audio packets among video packets in the incoming multimedia data stream 106 of FIG. 1 can lead to misalignment among video frames 116 and audio blocks 124. In prior art multimedia playback systems, the VPTS and APTS are often used in conjunction with the SCR to synchronize video and audio playback. For example, in a number of playback systems, the SCR is used to synchronize the multimedia playback system clock, which is then compared with the VPTS within video decoder 114 and the APTS within audio decoder 122 to determine the degree to which the two signals are out of sync (that is, where one data stream lags the other with respect to desired playback time). At some threshold level, an action is taken by the playback system to jump ahead in the lagging data stream to re-synchronize the signals (see, e.g., the Rosenau '352 patent).

While this re-synchronization process corrects for turbulence in the incoming data stream, it does not address additional perturbations that may follow due to variations in the availability of processing resources to the multimedia playback system. Processors with limited power or the overhead of other substantial and competing tasks may create playback backlogs, causing substantial numbers of video frames and audio blocks to remain stored in buffers. When such backlogs occur, the end-user can experience momentary and longer-lasting interruptions to the multimedia playback experience.

In the present invention, end user-perceived performance of multimedia applications is significantly enhanced by a novel method for rendering a digital video and digital audio data stream in a multimedia playback device with limited or highly varying processing power. Because users are less tolerant of interruptions in audio playback streams than in video playback streams, audio blocks are given priority in decoding and rendering. A simple yet reliable method is used to determine whether a video playback backlog exists, and in the event of a backlog, an efficient scheme is provided to reduce the backlog and re-synchronize the audio and video playback streams. An exemplary embodiment of this method is presented in FIG. 3(a).

In this embodiment, the multimedia playback system is taken to be a typical multimedia PC. As shown in FIG. 3, a processor 330 and a stored program memory 332 are shared by a variety of system elements including, for example, an audio decoder 322, an audio player 328, a video decoder 314 and a video player 320. As a shared resource, the processor 330 is neither dedicated to any individual element nor guaranteed to be available to any element at any specific time. Accordingly, the elements may contend for shared resources, leading to possible playback interruptions.

In prior art multimedia playback systems, such contention has been addressed by assigning priorities to each of the decoding and rendering tasks to be performed, and then assigning use of the shared resources according to these priorities. This approach, however, does not provide for any adjustment in the event that an unanticipated processing backlog occurs at one of the elements. In the present invention, the processor 330 of FIG. 3(a), as instructed by the stored program memory 332, assumes some additional control of decoding and rendering tasks in order to set priorities and reduce backlogs.

More specifically, the processor 330, as instructed by the memory 332, instructs the audio decoder 322 to retrieve a selected number N of encoded audio blocks 324 from the audio buffer 312, to decode these N audio blocks 324, and then to place them in the audio playback buffer 326. To reduce audio playback interruptions, we have found that this selected number N should be at least as large as the number of stages of audio playback buffering associated with the system, and may typically be an integer from two to four. After decoding, the processor 330 instructs the audio player 328 to play these decoded audio blocks. In addition, the processor 330 periodically monitors the number of decoded blocks remaining in playback buffer 326 and instructs the decoder 322 to decode a sufficient number of audio blocks to refill the playback buffer 326 as required.

After each audio block is played, the processor 330 examines the video buffer 310 to determine how many encoded video frames 306 are backlogged. If the number of backlogged encoded frames exceeds a specified threshold, the processor next determines whether any of the backlogged frames in buffer 310 are video key frames.

If the buffer 310 contains backlogged video key frames, the processor 330 instructs the video decoder 314 to decode the key frame in the backlogged sequence which has the highest sequence number and is therefore the most current in that sequence (hereinafter referred to as the latest key frame), as well as all other frames in the buffer 310 that follow this key frame and are thus later in the backlogged sequence. The processor 330 then instructs the video decoder 314 to place only that decoded frame which has the highest sequence number in the video playback buffer 318. This frame is accordingly latest in the decoded frame sequence, and is hereinafter referred to as the most current decoded frame. The processor 330 finally instructs the video player 320 to play this most current decoded frame. As a result, only those backlogged frames required to decode the most current decoded frame are decoded, and only the most current decoded frame is played. All other backlogged frames are effectively discarded.

If no key frames are contained in the buffer 310, the processor 330 instructs the video decoder 314 to decode all backlogged frames in the video buffer 310, and to place the most current decoded frame in the backlogged sequence in playback buffer 318. Then, once the appropriate backlogged video frames in buffer 310 have been decoded, the processor 330 instructs the video player 320 to retrieve the most current decoded frame from buffer 318 for rendering.

Figure 3B:
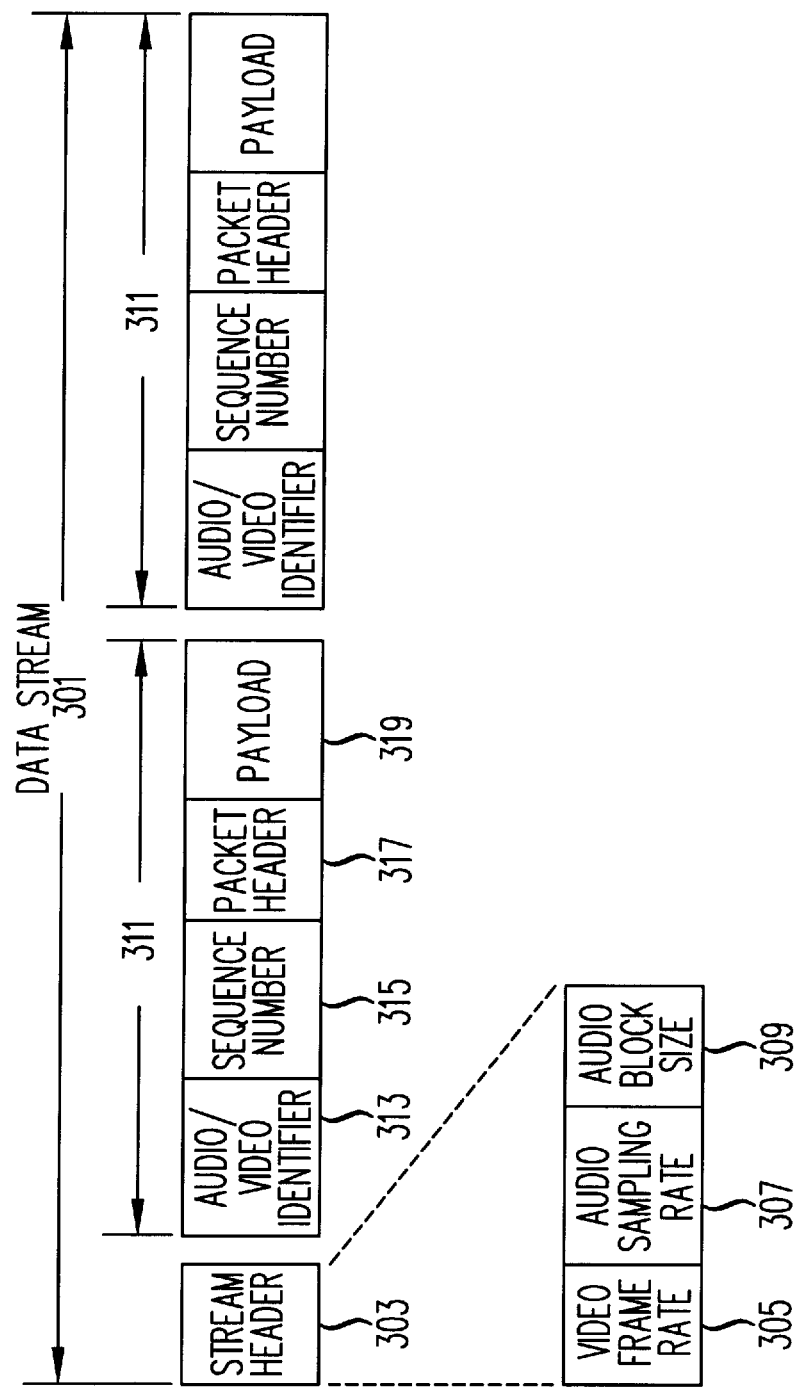
FIG. 3(b) provides a high-level view of the organization of packetized audio and video data used by the illustrative embodiment of the invention.

A basic format for the data stream operated on by the system 300 is shown in FIG. 3(b). This format provides one example in accordance with the present invention. A variety of other data formats are also possible and contemplated within the scope of the present invention.

A data stream 301 comprises data packets 311, and each packet includes an identifier 313 that indicates whether the packet carries audio or video data, and a sequence number 315 that establishes the order in which the audio and video packets should each be depacketized and stored. Additionally, each packet 311 includes a packet header 317 and a data payload 319. The entire data stream 301 begins with a stream header 303. The stream header 303 contains a video frame rate 305, an audio sampling rate 307 and an audio block size 309.

Figure 3C:
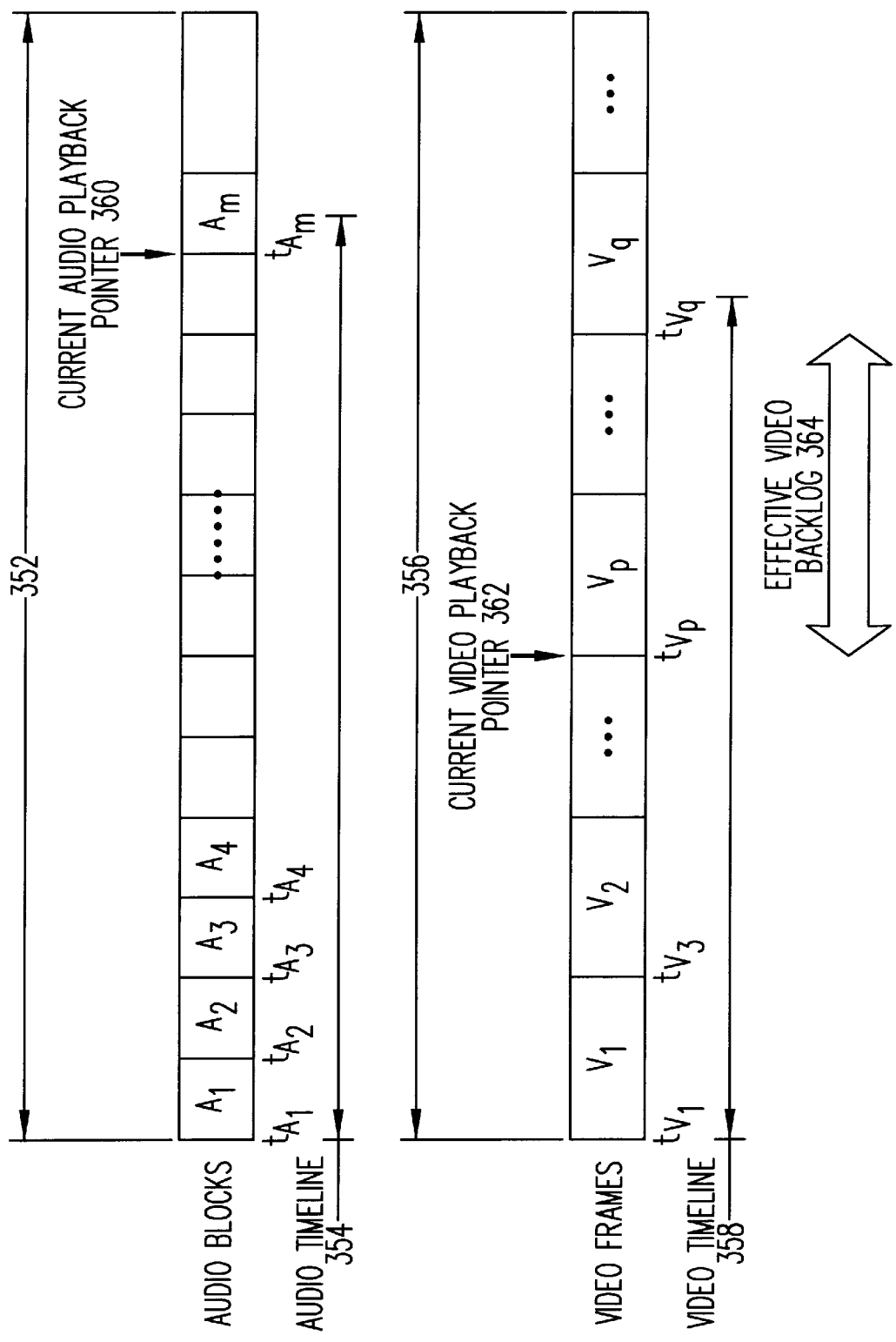
FIG. 3(c) diagrams the time relationship between the audio playback and video playback streams as operated on by the invention.

FIG. 3(c) illustrates how a backlog condition is determined. Encoded data representing audio blocks 352 arrive and are placed in sequence order in the audio buffer 312 of FIG. 3(a). Sequence may be established by using the sequence numbers 315 described in FIG. 3(b), or by some alternative means. As illustrated in FIG. 3(c), an audio timeline 354 is established, with time stamp $t_{Ai}$ for each audio block sequence number i, where the time stamp represents the desired time for playback of audio block $A_i$ to begin, and is calculated as:

$$t_{Ai} = i * (\text{data samples per audio block/audio sampling rate}) \quad (1)$$

where the number of data samples per block 309 and the audio sampling rate 307, per FIG. 3(b), are established in the stream header 303 of the data stream 301. The sampling rate and number of samples per block vary according to the selected standard. For example, a "CD quality" audio transmission under MPEG-I might be sampled at a rate of 44.1 kilohertz (kHz), and include 1024 samples in a block. Either the sequence number or the time stamp are stored with an associated encoded frame or block, respectively, in the buffers 318, 326 of FIG. 3(a).

Encoded data representing video frames 356 of FIG. 3(b) arrive and are placed in sequence order in the video buffer 310 of FIG. 3(a). Again, sequence may be established by using the sequence numbers 315 described in FIG. 3(b), or by some alternative means. As illustrated in FIG. 3(c), a video timeline 358 is established, with time stamp $t_{Vj}$ for each video frame j, where the time stamp represents the desired time for playback of video frame $V_j$ to begin, and is calculated as:

$$t_{Vj} = j/(\text{video frame rate}) \quad (2)$$

where the video frame rate 305, per FIG. 3(b), is contained in the stream header 303 of the data stream 301. Video frame rate will vary according to the selected standard and the capabilities of the playback device. For example, a high-quality video frame rate might be established at 30 frames per second (fps). Because this frame rate may exceed the capacity of many current desktop multimedia systems, a frame rate of 10 to 15 fps is more typical.

With continued reference to FIG. 3(b), a current audio playback pointer 360 identifies the next audio block to be decoded from the audio buffer 312 of FIG. 3(a), and a current video playback pointer 362 identifies the next video frame to be decoded $V_p$ from the video buffer 310 of FIG. 3(a). The time stamp $t_{V_p}$ is determined for $V_p$, and the time stamp $t_{Am}$ is determined for the next audio frame to be decoded $A_m$. The video backlog 364 of FIG. 3(c) consists of:

Video frames $V_b$, where $$b \in (\text{sequence p, q}) \text{ such that } t_{V_p} <= t_{V_b} < t_{Am} \qquad (3)$$

Figure 6:
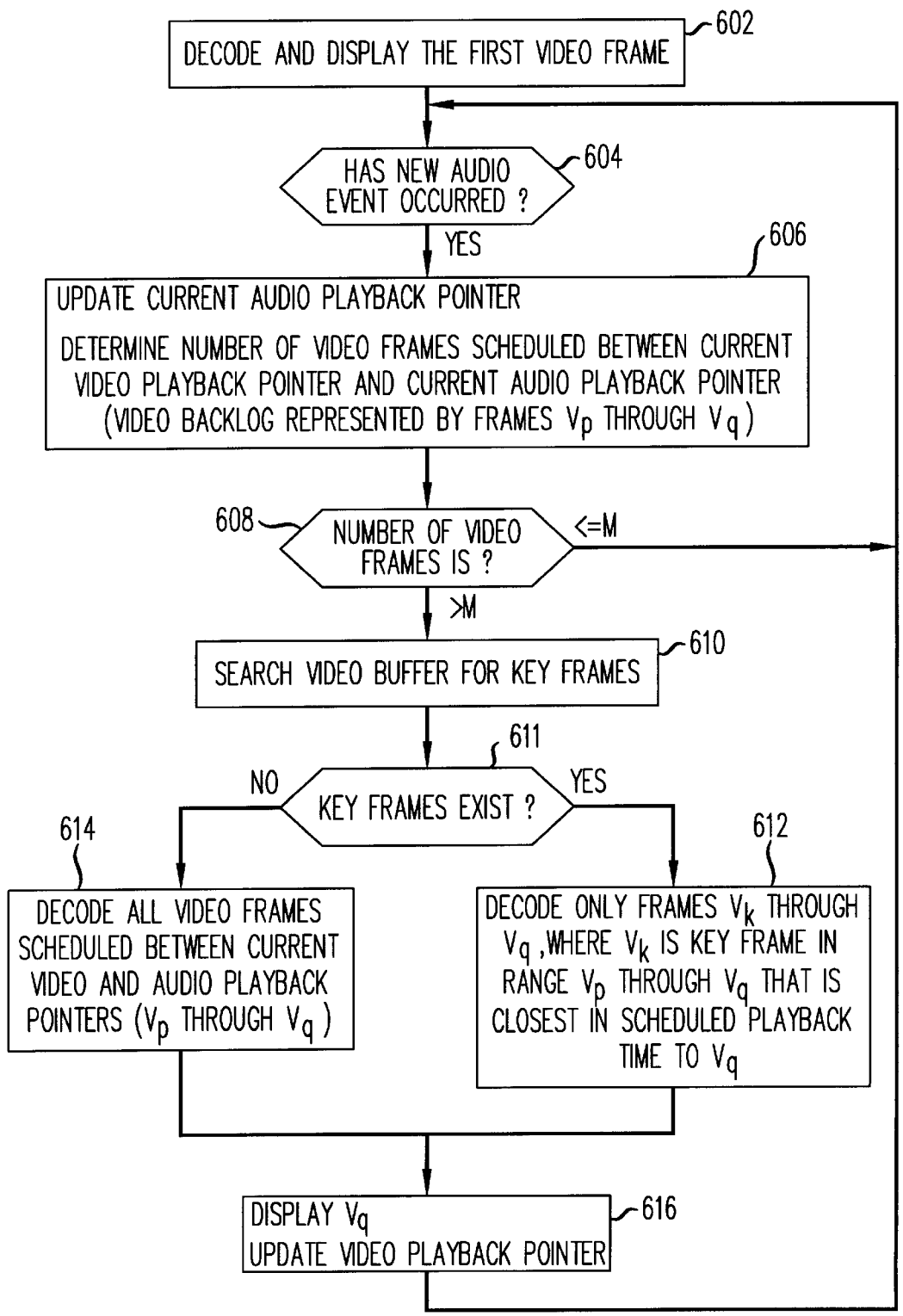

As illustrated in FIG. 3(c), the video backlog 364 consists of the sequence of video frames beginning with $V_p$ and ending with $V_q$. Video backlog will be used to adapt the video decoding and rendering process, as illustrated in FIG. 6 and described further herein.

Figure 4:
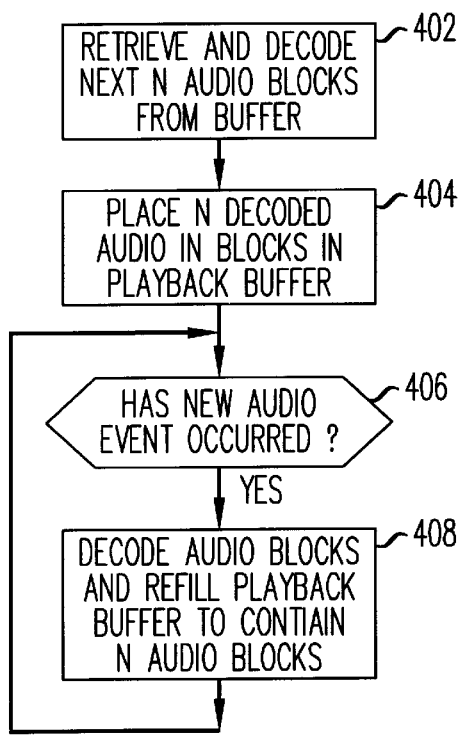
FIGS. 4, 5 and 6 provide flowcharts illustrating the inventive processes used to decode and render audio blocks and video frames, and to re-synchronize video and audio playback when video frame rendering seriously lags audio block rendering.

Because users are less tolerant of interruptions in audio playback streams than in video playback streams, the audio decoding and playback processes are given higher priority than the video decoding and playback processes. FIG. 4 provides a flowchart for the audio data decoding process.

In step 402 of FIG. 4, the audio decoder 322 of FIG. 3(a) retrieves and decodes N audio blocks from the audio buffer 312. In step 404 of FIG. 4, audio decoder 322 of FIG. 3(a) places these N decoded blocks into audio playback buffer 326, and in step 406 of FIG. 4, awaits the arrival of an audio event. Audio events serve as a basic clock or triggering mechanism for the audio and video decoding and playback processes.

The number of retrieved audio blocks N is typically a system parameter set by the multimedia system, and should be sufficiently large to provide few interruptions in the audio playback. An integer N with a value from two to four blocks has been found to be effective for many multimedia applications employing desktop PC's for the playback device.

Figure 5:
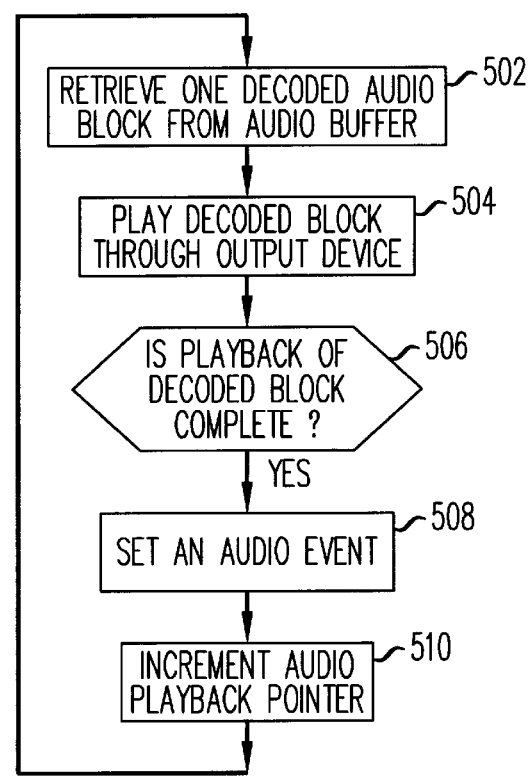

A flowchart depicting the audio playback process is provided in FIG. 5, and includes the steps required to generate an audio event. In step 502 of FIG. 5, the audio player 328 of FIG. 3(a) retrieves a decoded audio block from the audio playback buffer 326, and plays this block through an audio output device in step 504. In decision step 506 of FIG. 5, the audio player 328 of FIG. 3(a) monitors the completion of the audio block playback, and when complete, generates an audio event in step 508. After generating this audio event, the processor 330 increments the audio playback pointer, and returns to step 502 of FIG. 5 to retrieve the next decoded audio block. Consistent with the design of the associated buffers, an audio block is effectively discarded from the audio buffer and audio playback buffer after it has been decoded and rendered, respectively.

The audio event as generated by the audio playback process is detected by the audio decoder 322 of FIG. 3(a) in decision step 406 as illustrated in FIG. 4. In step 408, the audio decoder 322 of FIG. 3(a) retrieves and decodes an additional number of encoded audio blocks from the audio buffer 312, until the audio playback buffer 326 again contains N decoded audio blocks. The audio decoder 322 then returns to decision step 406 of FIG. 4 to await arrival of the next audio event before moving once again to step 408 to replenish the audio playback buffer 326 of FIG. 3(a).

A flowchart that illustrates the video decoding and playback process is provided in FIG. 6. In step 602, the video decoder 314 of FIG. 3(a) decodes the first video frame, and stores this frame in the video playback buffer 318 for playback by the video player 320. In step 604 of FIG. 6, the video decoder 314 of FIG. 3(a) then awaits the arrival of an audio event. After detecting the arrival of an audio event, the video decoder 314 moves to step 606 of FIG. 6 to increment the current audio playback pointer 310 of FIG. 3 and determine the video backlog 314. In step 608 of FIG. 6, the video decoder 314 of FIG. 3(a) takes one of two actions according to the size of the video backlog.

If the video backlog is less than an integer M, the video decoder 314 returns to step 604 of FIG. 6 and awaits the arrival of the next audio event. If the video backlog is equal to or greater than M, in step 610, the video decoder 314 searches the backlogged frames to determine whether any are video key frames.

If a video key frame is found, the video decoder 314 of FIG. 3(a) in step 612 of FIG. 6 selects the most current backlogged key frame $V_k$ (based on time stamp $t_{Vk}$), begins decoding forward in the sequence until the most current backlogged video frame $V_q$ has been decoded, and places this decoded most current backlogged frame $V_q$ in the video playback buffer 318. If no video key frame is found, the video decoder 314 of FIG. 1 in step 614 of FIG. 6 decodes all video frames in the backlog $V_p$ through $V_q$, and places the most current backlogged video frame $V_q$ in the video playback buffer 318. In either case, only the video information necessary to construct the most current backlogged video frame $V_q$ is decoded. After these necessary backlogged frames are decoded, consistent with the design of the video buffer 310 of FIG. 3(a), all backlogged frames $V_p$ through $V_q$ are effectively discarded from the buffer 310.

In step 616 of FIG. 6, the video player 320 of FIG. 3(a) retrieves the most current decoded frame $V_q$, from video playback buffer 318, plays this frame, and increments video playback pointer 312 of FIG. 3(b). Consistent with the design of playback buffer 318, decoded frame $V_q$ is effectively discarded from playback buffer 318 after it has been rendered by video player 320.

The integer M, which sets a threshold level for video backlog, should be set so that large discontinuities in the video playback are minimized. In a typical PC-based environment, we believe that M is most effectively set to an integer value of one.

As should be evident to those skilled in the art, according to the present invention as depicted in FIGS. 4 through 6, the audio decoding and playback processes in a multimedia player receive priority over the video decoding and playback processes. Because audio playback is afforded essentially an uninterrupted priority, each audio playback cycle is completed in a relatively fixed and predictable time period. Accordingly, each cycle completion is used as a clock to trigger an "audio event" that regulates both the audio and video playback and decoding processes. When a video decoding backlog is detected, synchronization between audio blocks and video frames is reestablished by allowing the video decoder 314 of FIG. 3(a) to skip over all video frames that are not required to decode and display the most current video frame $V_q$ in the backlogged sequence, and by allowing the video player 320 to play only this most current video frame $V_q$. Granting priority to the decoding and rendering of audio blocks minimizes user-experienced delays in audio playback, which we have found to be far more disruptive to system users than small delays or omissions in the video playback sequence.

The exemplary embodiment of this method described above is but one of a number of alternative embodiments of the invention that will be apparent to those skilled in the art in view of the foregoing description. Accordingly, this description is to be construed as illustrative only and is for the purpose of teaching those skilled in the art the best mode of carrying out the invention. Various other alternatives can be devised by a worker skilled in the art without departing from the teachings of this invention. For example, this invention could be implemented using a single audio buffer and a single video buffer, each capable of storing both encoded and decoded data representing audio blocks and video frames, respectively. As an additional example, values selected for the video frame backlog (M), the number of audio blocks retrieved (N) and the number of audio blocks played (one) per audio event cycle can be altered from the values recommended herein. One skilled in the art could also readily adapt the method disclosed by this invention to grant priority to video decoding and rendering rather than audio decoding and rendering.

We claim:

1. A method, for use in a multimedia playback system that decodes and renders a combined sequence of encoded audio and video information, for reducing playback disruptions, said method comprising the steps of:
   granting priority to decoding and rendering said audio information;
   monitoring the rendering of decoded audio and video information to determine whether it is backlogged relative to the rendering of said audio information; and
   when said video information is backlogged, reducing said video backlog by
      decoding only the backlogged video information that must be decoded to render the most current video image in the sequence of said backlogged video information,
      rendering only said most current video image from said backlog, and
      discarding all other video information not necessary to produce said most current video image.

2. A method, for use in a multimedia playback system, for rendering a sequence of encoded video frames and audio blocks, said method comprising the steps of:
   decoding a selectable number of said audio blocks from said audio and video sequence;
   monitoring the rendering by said system of each audio block;
   determining a number representing the number of backlogged video frames stored by said system at a time immediately after the rendering of each audio block; and
   when said number of backlogged video frames exceeds a specified number, eliminating said backlog by
      determining whether said backlogged video frames include any key frames,
      identifying a smallest set of said backlogged video frames that must be decoded in order to render a most current video frame in the sequence of said backlogged video frames,
      decoding said smallest set of backlogged video frames, and
      rendering said most current video frame in said backlogged sequence from said smallest set of backlogged video frames.

3. The method of claim 2, when said sequence of backlogged video frames includes at least one video key frame, wherein said smallest set of backlogged video frames includes a most current key frame in said sequence of backlogged video frames and all other backlogged video frames that follow said most current key frame in said sequence of backlogged frames.

4. The method of claim 2, when said sequence of backlogged video frames includes no video key frames, wherein said smallest set of backlogged video frames includes all backlogged video frames.

5. The method of claim 2, wherein said specified number of video frames is equal to one.

6. The method of claim 2, wherein said selectable number of audio blocks is an integer from two to four.

7. The method of claim 2, wherein said sequence of backlogged video frames includes video frames whose scheduled time for playback occurs no earlier than the scheduled playback time for a video frame that is the most recently rendered video frame, and no later than the scheduled playback time for an audio frame that is the next audio frame scheduled for rendering.

8. The method of claim 7, wherein said scheduled audio playback time is determined as a function of a sequential index number for each audio block, a number representing the number of encoded samples provided per audio block, and an audio sampling rate.

9. The method of claim 7, wherein said scheduled video playback time is determined as a function of a sequential index number for each video frame and a video frame rate.

10. A multimedia system for sequentially rendering digital video and audio information with high user-perceived fidelity, said system comprising:
   an audio decoding and playback section;
   a video decoding and playback section; and
   a processor with stored program memory, where said processor supports video and audio playback by:
      decoding a selectable number of audio blocks from said audio and video sequence;
      monitoring the completed rendering by said system of each audio block;
      determining the number of backlogged video frames stored by said system at the time immediately after the rendering of each audio block;
      determining whether said backlogged video frames include any key frames; and
      when said number of backlogged video frames exceeds a specified number, eliminating said backlog by
         identifying a fewest number of said backlogged video frames that must be decoded in order to render a most current video frame in the sequence of said backlogged video frames,
         decoding said fewest number of backlogged video frames, and
         rendering said most current video frame in said backlogged sequence.

11. The multimedia system of claim 10, wherein said audio decoding and playback section includes a buffer for encoded audio blocks, a decoder, a buffer for decoded blocks and an audio player.

12. The multimedia system of claim 11, wherein said audio buffers are implemented as circular data buffers.

13. The multimedia system of claim 10, wherein said video decoding and playback section includes a buffer for encoded video frames, a decoder, a buffer for decoded frames and a video player.

14. The multimedia system of claim 13, wherein said video buffers are implemented as circular data buffers.

15. The multimedia system of claim 10, wherein said multimedia system is selected from the group consisting of personal computers, engineering workstations and digital signal processors with multimedia playback capabilities.

* * * * *